(12) United States Patent
Kleckner

(10) Patent No.: US 7,150,442 B2
(45) Date of Patent: Dec. 19, 2006

(54) ICE SHELTER MODULAR SEATING SYSTEM

(75) Inventor: Ryan J. Kleckner, Grafton, WI (US)

(73) Assignee: Frabill, Inc., Jackson, WI (US)

( * ) Notice: Subject to any disclaimer, the term of this patent is extended or adjusted under 35 U.S.C. 154(b) by 190 days.

(21) Appl. No.: 10/811,438

(22) Filed: Mar. 26, 2004

(65) Prior Publication Data

US 2004/0245817 A1 Dec. 9, 2004

Related U.S. Application Data

(60) Provisional application No. 60/474,904, filed on Jun. 3, 2003.

(51) Int. Cl.
*F16M 13/00* (2006.01)
*A47C 7/62* (2006.01)
*B63B 17/00* (2006.01)

(52) U.S. Cl. .................. 248/429; 114/363; 135/116; 135/137; 248/503.1; 297/217.7; 297/256.1

(58) Field of Classification Search ............ 248/200.1, 248/205.1, 424, 429, 440, 503.1; 297/217.7, 297/252, 256.1, 256.16; 135/116, 901, 137; 114/363, 364
See application file for complete search history.

(56) References Cited

U.S. PATENT DOCUMENTS

| 2,836,223 | A | | 5/1958 | Kent |
| 3,718,365 | A | * | 2/1973 | Gibson .................. 297/344.24 |
| 3,795,927 | A | * | 3/1974 | Darwin et al. .............. 114/363 |
| 3,797,436 | A | * | 3/1974 | Moore .......................... 114/71 |
| 3,821,825 | A | * | 7/1974 | Bailey ......................... 114/363 |
| 4,357,894 | A | * | 11/1982 | Kirk ............................ 114/347 |
| 4,649,852 | A | * | 3/1987 | Piantedosi .................. 114/363 |
| 4,766,838 | A | | 8/1988 | Johnson |
| 5,133,378 | A | | 7/1992 | Tanasychuk |
| 6,189,478 | B1 | * | 2/2001 | Myers et al. ................ 114/344 |
| 6,397,870 | B1 | | 6/2002 | Makedonsky et al. |
| 2004/0245817 | A1 | * | 12/2004 | Kleckner ................. 297/217.7 |

* cited by examiner

*Primary Examiner*—Carl D. Friedman
*Assistant Examiner*—Tan Le
(74) *Attorney, Agent, or Firm*—Joseph S. Heino; Patrick M. Bergin

(57) ABSTRACT

An ice shelter modular seating system includes a base unit, one or more seat mount units and one or more seat leg units. The base unit is a generally rectangular tub-like member having a front wall and a floor. The floor includes a longitudinally extending and integrally formed track. This track is functionally adapted to receive the lowermost portion of the seat leg units in it, the track being used to restrain the seat leg units from front to back movement relative to the base unit front wall. A seat mount unit is removably attachable to the base unit front wall and is configured to rest upon the seat leg unit. In this fashion, seat mount units can be positioned along the base unit as desired or required in an almost infinite number of positions and combination of positions, with placement of the seat mount units being be made quickly and easily.

28 Claims, 2 Drawing Sheets

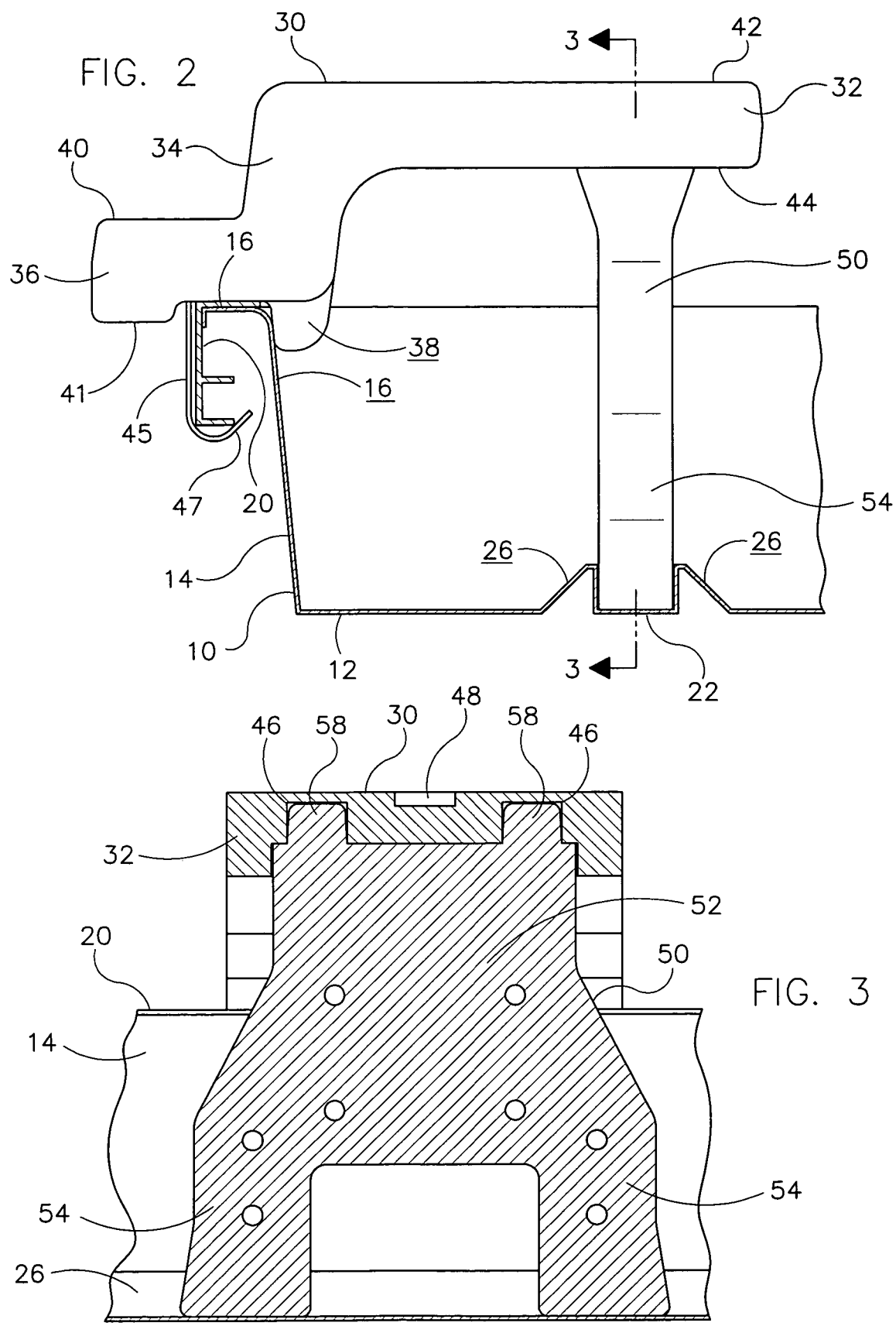

ICE SHELTER MODULAR SEATING SYSTEM

This application claims the benefit and priority of U.S. Provisional Pat. No. 60/474,904 filed Jun. 3, 2003.

FIELD OF THE INVENTION

This invention relates generally to items and accessories used by anglers in the sport of fishing. More particularly, it relates to a modular seating system that is used with an ice shelter during the ice fishing season. It also relates to a modular seating system that requires no permanent hardware to attach and to reattach the components of the system together, again and again.

BACKGROUND OF THE INVENTION

Fishing has evolved from being a means of human survival in ancient times to being a competitive and recreational sport in modern times. Accordingly, modern anglers spend substantial amounts of time conducting their outdoor fishing expeditions exposed to the elements, but do so with some minimal expectation of comfort and convenience. This is particularly true when it comes to ice fishing, a known cold weather endeavor.

In the experience of this inventor, ice shelters have long been combined with seats or seating arrangements. This is old art. However, seating arrangements of the prior art have not been designed or constructed such that the position of the seats could be easily or conveniently changed. In such devices, the seating is typically accomplished by a series of bolted brackets and frames that support a seat and that bridge the storage space either between and/or behind the seats. While some of the seats can be removed or repositioned, such is not done easily or quickly, and the frame always remains. This results in a decreased ability to access the base and its storage space. In some instances, access to the base storage space is not even possible. In another seating device that simply uses a standard open head pail that is turned upside down, there is a lack of stability. Obviously, there is also a lack of comfort during extended periods of sitting.

Accordingly, it is an object of the present invention to provide a new and useful ice shelter modular seating system that provides convenience and comfort. It is another object of the present invention to provide such a system that requires no permanent hardware to attach the components of the system together. It is still another object of the present invention to provide such a system where seats of original equipment manufacture (OEM) can be readily attached and easily moved to various positions, including being added to or removed from the system. It is yet another object of the present invention to provide such a system that does not interfere with storage space and access to the base behind and between individual seats. And it is still another object of the present invention to provide such a system that is relatively simple in construction, that is lightweight for ease of use and transportation, and that can be made from a minimal number of elements.

SUMMARY OF THE INVENTION

The ice shelter modular seating system of the present invention has obtained these objects. It provides for a modular seating system that includes a base unit, one or more seat mount units and one or more seat leg units. The base unit is a generally rectangular tub-like member having a front wall and a floor. The floor includes a longitudinally extending and integrally formed track. This track is functionally adapted to receive the lowermost portion of the seat leg units in it, the track being used to restrain the seat leg units from front to back movement relative to the base unit front wall. A seat mount unit is removably attachable to the base unit front wall and is configured to rest upon the seat leg unit. In this fashion, seat mount units can be positioned along the base unit as desired or required in an almost infinite number of positions and combination of positions. Moreover, the placement and removal of the seat mount units can be accomplished quickly and easily.

The foregoing and other features of the present invention will be apparent from the detailed description that follows.

BRIEF DESCRIPTION OF THE DRAWINGS

FIG. 2 is an enlarged left side elevational and partially sectioned view of the system illustrated in FIG. 1.

FIG. 3 is a rear elevational and partially sectioned view of the system taken along line 3—3 in FIG. 2.

DETAILED DESCRIPTION

Figure 1:
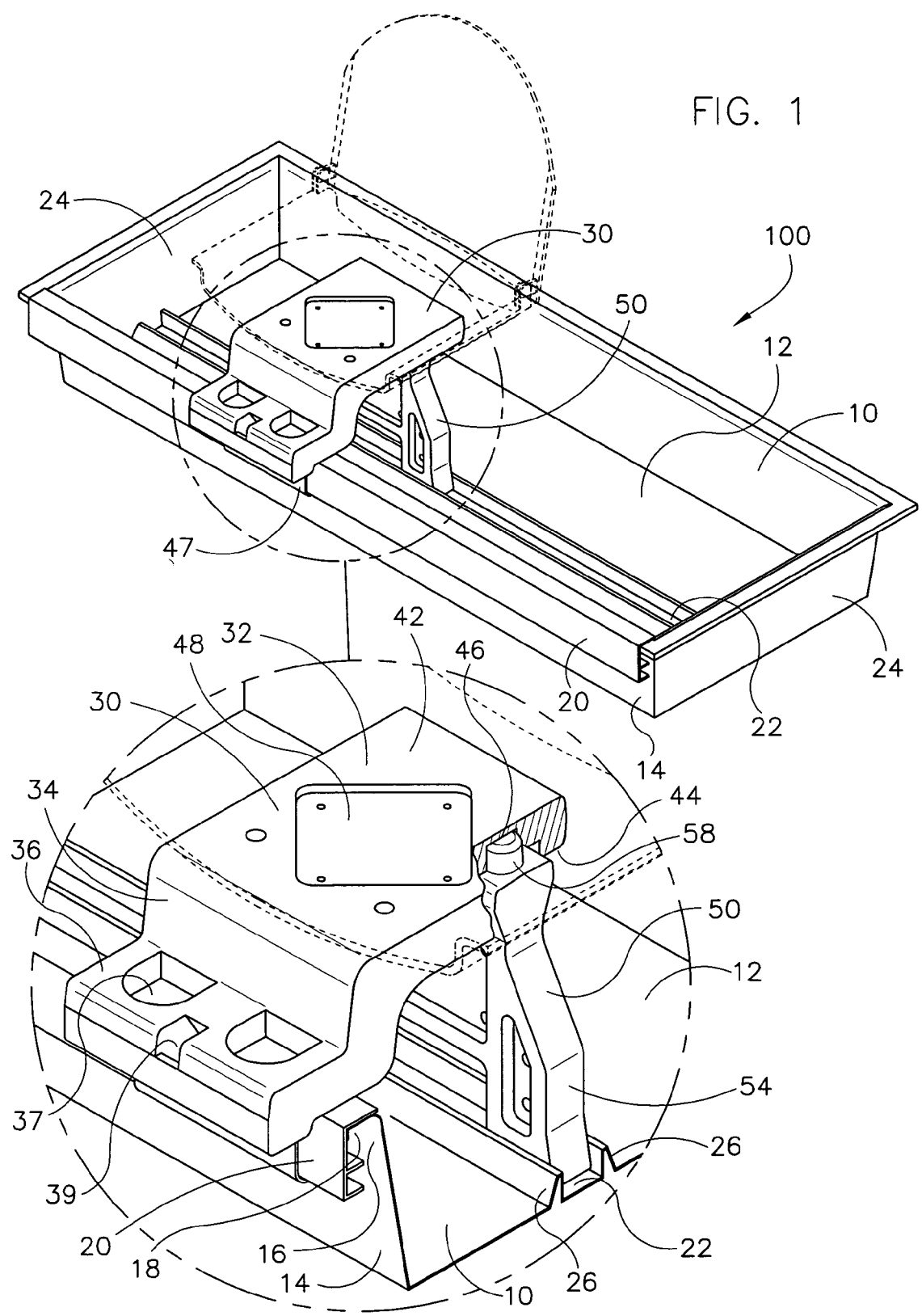
FIG. 1 is a front, top and right side perspective view of a modular seating system constructed in accordance with the present invention.

Referring now to the drawings in detail wherein like numbers represent like elements throughout, FIG. 1 illustrates a perspective view of one embodiment of the ice shelter modular seating system, generally identified 100, constructed in accordance with the present invention. FIG. 1 also includes an enlarged inset view of one area of interest relative to the system illustrated. As shown, the preferred embodiment of the seating system 100 includes a base unit 10, at least one seat mount unit 30 and at least one seat leg unit 50. It is to be understood, however, that the seat mount unit 30 and the seat leg unit 50 could be integrally formed as a single item without deviating from the scope of the invention.

The base unit 10 is a generally rectangular tub-like or trough-like member having a base floor 12 and at least one primary or front base wall 14 that extends generally upwardly from the base floor 12. In the preferred embodiment, an enclosure is formed by the primary or front base wall 14 and a plurality of adjoining secondary base walls 24. Toward the uppermost edge 16 of the primary base wall 14 is a generally horizontal and outwardly extending front wall lip 18. Attached to the front wall lip 18, and extending longitudinally with it, is a support member or extrusion 20. In the preferred embodiment, the support extrusion 20 faces outwardly of the base unit 10 and is fabricated of an extruded metal material. The support 20 could, however, be constructed of a non-extruded and/or a non-metal material such as fiberglass, carbon fiber, and the like, without deviating from the scope of this invention. The purpose of this configuration will be apparent later in the detailed description.

Although not shown, it is to be understood that the system 100 of the present invention would require additional hardware, a tubular frame and tent or other covering in order to be used as a completely functional ice fishing shelter under normal use conditions. The presence or absence of that hardware, frame and covering is not a limitation of the present invention.

Continuing with the essential elements, it will be seen in FIG. 1 that the base floor 12 of the base unit 10 includes at least one longitudinally extending leg track 22, the leg track 22 being integrally formed within the base floor 12 by a pair of opposing flanges 26. It is to be understood that the opposing flanges 26 could be separately attachable to the base floor 12 without deviating from the scope of this invention. It is also to be understood that dual leg tracks 22 could be configured and fabricated into the system of the present invention without deviating from the scope of the claims herein. In the preferred embodiment, the base unit 10, including all of its component parts as alluded to herein, is formed of a lightweight, but sturdy, plastic or vinyl material. In this fashion, the base unit 10 can be transported relatively easily from one ice fishing site to another and, once in place, provides a protective barrier from the elements.

The seat mount unit 30 is also formed, in the preferred embodiment, in a blow or injection molded unitary construction fashion. That is, the seat mount unit 30 includes a top portion 32, a middle portion 34 and a front portion 36, each portion 32, 34, 36 being integrally formed as part of the others. Such is not, however, a limitation of the system of the present invention. Each portion could be separately constructed and then the various portions attached to one another without deviating from the scope of this invention. Similarly, the seat mount unit 30 could be integrally formed with the leg seat unit 50 without deviating from the scope of this invention.

The top portion 32 of the seat mount unit 30 includes a top surface 42 and a bottom surface 44. The top surface 42 of the seat mount unit 30 includes a mount pad 48 for accommodating the swivel base an OEM boat seat therewithin. A representative seat is shown in FIG. 1 in phantom view. In the preferred embodiment, the seat is configured in a fold-down bucket seat style and includes a 360° swivel base for added maneuverability. The precise seat or type of seat used and mounted to the mount pad 48, however, is not a limitation of the present invention. The top surface 42 of the seat mount unit 30 could also be used, without a seat mounted to it, as a table or other flat support surface.

The bottom surface 44 of the seat mount unit top portion 32 includes a pair of hollows 46 defined within it. The purpose and function of these hollows 46 will become further apparent later in this detailed description.

It is also to be understood that, although the particular embodiment illustrated in FIG. 1 and described herein shows only one seat mount unit 30 being utilized, the precise number of seat mount units 30 is not a limitation of this invention. Multiple seat arrangements are possible with the system of the present invention. And the multiple seat arrangements allow the seat mount units 30 to be positioned to face in virtually any direction without deviating from the scope of this invention. Similarly, the location of the seat, shown in phantom view, is not a limitation of the present invention, nor would the location of multiple seats be a limitation if such was desired or required by the user or users of the system.

Extending generally forwardly of and downwardly from the top portion 32 of the seat mount unit 30 is a middle seat mount portion 34. The middle portion 34 of the seat mount unit 30 further includes a downwardly extending support portion 38 which effectively serves to stabilize the seat mount unit 30 at the point of the uppermost edge 16 of the front base wall 14. See FIG. 2. Extending forwardly and generally horizontally from the middle portion 34 is a front seat mount portion 36. The front seat mount portion 36 includes a top surface 40 and a bottom surface 41. Attached to the bottom surface 41 of the front seat mount portion 36 and extending generally downwardly from it is a seat mount retaining bracket 45. The seat mount retaining bracket 45 includes an inwardly extending flange 47, the flange 47 being provided to secure the seat mount unit 30 to a portion of the base unit 10. In an alternative embodiment, the bracket 45 could be replaced by a hinge (not shown) or other attachment means. In either embodiment, the top surface 40 of the front seat mount portion 36 includes a number of cup-holding openings 37 and a rod holder 39 for utility and the user's convenience.

The system 100 of the present invention also includes one or more seat leg units 50, one seat leg unit 50 being provided for each seat mount unit 30 that is used by the angler. The seat leg unit 50 is also formed, in the preferred embodiment, in a unitary blow or injection molded construction fashion. That is, the seat leg unit 50 includes a top bridge portion 52 and a pair of leg portions 54, each portion 52, 54 being integrally formed as part of the others. See FIG. 3. For example, the seat leg unit 50 could be produced by a plastic injection molding process. Such is not, however, a limitation of the system 100 of the present invention. Each portion could be separately constructed and then the various portions attached to one another without deviating from the scope of this invention. As also alluded to earlier, the seat mount unit 30 and seat leg unit 50 could be integrally formed, or even hingedly attachable to one another, without deviating from the scope of this invention. Situated along the upper surface 56 of the bridge portion 52 is a pair of stubs 58 extending upwardly therefrom. The stubs 58 are functionally adapted to be received by the pair of hollows 46 defined within the bottom surface 44 of the top portion 32 of the seat leg unit 30.

In application, the user transports the base unit 10 to a suitable fishing location. At this point, the base unit 10 includes at least one of the other various component parts used with the system 100. The user then determines how many seats will be desired of required and where each seat will be generally located within the base unit 10. Depending on the desired placement, a seat leg unit 50 is stood upright and is situated within and along the track 22 that is defined within the bottom floor 12 of the base unit 10. A cooperating seat mount unit 30 is then located generally forward of the leg mount unit 50. The front end 36 of the seat mount unit 30 is tilted downwardly sufficiently to allow the flange 47 of the seat mount retaining bracket 45 to engage the extrusion 20. The seat mount unit 30 is then lowered towards the seat leg unit 50 such that the hollows 46 defined within the bottom surface 44 of the seat mount unit 30 engage and rest upon the stubs 58 of the seat leg unit 50. This process is repeated for each seat mount unit 30 that is to be mounted within the base unit 10. Upon successful completion of the fishing trip, the reverse of the aforementioned steps is performed to break-down the system 100 for quick and easy storage and transport of the component parts.

This application would obviously be somewhat modified where the seat mount unit 30 and the seat leg unit 50 are integrally formed. The application would also be modified where the seat mount bracket 45 is replaced with a hinge (not shown). The application would not be substantially modified where the seat mount unit 30 is not used for supporting a seat, but rather is used as a table top or other support surface for the convenience of the user.

Based upon the foregoing, it will be seen that there has been provided a new and useful ice shelter modular seating system that provides convenience and comfort; that requires no permanent hardware to attach the components of the system together; that can use seats of original equipment manufacture, which seats can be readily attached and easily moved to various positions, including being added to or removed from the system; that does not interfere with storage space and access to the base behind and between individual seats; that is relatively simple in construction, is lightweight for ease of use and transportation, and can be made from a minimal number of elements.

The principles of this invention having been fully explained in: connection with the foregoing, I hereby claim as my invention:

1. An ice shelter modular seat system comprising:
   a base unit comprising a generally rectangular member having a base floor, the base floor including at least one leg track formed within the base floor by a pair of opposing flanges, at least one primary base wall that extends generally upwardly from the base floor, the at least one primary base wall including a generally horizontal and outwardly extending primary wall lip and a longitudinally extending support member attached to the primary wall lip, and a plurality of adjoining secondary base walls;
   at least one seat mount unit comprising a top portion comprising a top surface and a bottom surface, the top surface of the seat mount unit including a mount pad for accommodating a base for a boat seat therewithin; and
   at least one seat leg unit being capable of attachment to the bottom surface of the at least one seat mount, the seat leg unit fitting within the flanges of the leg track.

2. The modular seat system of claim 1 wherein the at least one seat mount unit and the at least one seat leg unit are integrally formed.

3. The modular seat system of claim 1 wherein the support member is made of an extruded metal material.

4. The modular seat system of claim 1 wherein the at least one seat leg unit includes a top bridge portion and a pair of leg portions.

5. The modular seat system of claim 4 wherein the top bridge portion of the at least one seat leg unit includes an upper surface and at least one stub extending upwardly therefrom.

6. The modular seat system of claim 5 including means for attaching the at least one seat mount unit to the at least one seat leg unit.

7. The modular seat system of claim 6 wherein the seat mount unit and seat leg unit attaching means comprises a pair of hollows defined within the bottom surface of the seat mount unit top portion, each hollow being functionally adapted to receive a leg unit stub therewithin.

8. The modular seat system of claim 1 wherein the seat mount unit comprises a middle portion that extends generally forwardly of and downwardly from the top portion of the seat mount unit and includes a downwardly extending support portion for stabilizing the seat mount unit at the point of the uppermost edge of the primary base wall.

9. The modular seat system of claim 1 wherein the seat mount unit front portion includes a top surface and a bottom surface.

10. The modular seat system of claim 9 including means for removably attaching the seat mount unit to the primary wall of the base unit.

11. The modular seat system of claim 10 wherein the seat mount unit and base unit attaching means includes a seat mount retaining bracket attached to the bottom surface of the front seat mount portion and extending generally downwardly from it.

12. The modular seat system of claim 11 wherein the seat mount retaining bracket includes an inwardly extending flange, the bracket flange being engagable with a portion of the longitudinally extending support member.

13. The modular seat system of claim 1 including hinge means for attaching the seat mount unit to the primary wall of the base unit.

14. The modular seat system of claim 9 where the top surface of the front seat mount portion includes a number of cup-holding apertures and a rod holding aperture.

15. The modular seat system of claim 1 wherein the at least one seat mount unit is made of a single piece of molded material.

16. The modular seat system of claim 4 wherein the at least one seat leg unit is made of a single piece of molded material.

17. An ice shelter modular seat system for securing a plurality of seats in variable proximal locations comprising:
   a base comprising a generally rectangular tub like base member having a base floor, a primary base wall that extends generally upwardly from the base floor, at least one longitudinally extending leg track comprising a pair of opposing flanges and a plurality of adjoining secondary base walls, the primary base wall further comprising a generally horizontal and outwardly extending lip and a longitudinally extending support member attached to the lip;
   a plurality of seat legs; and
   a plurality of seat mounts each comprising a top portion, a middle portion, and a front portion, the top portion including a top surface and a bottom surface, the top surface comprising a mount pad for accommodating a base for a boat seat therewithin, each seat mount is being capable of removable engagement with one of the plurality of seat legs, the seat legs being capable of movement along the leg track of the base.

18. The modular seat system of claim 17 wherein each of the plurality of seat legs includes an upper surface and at least one stub extending upwardly therefrom.

19. The modular seat system of claim 18 including means for attaching at least one seat mount to at least one seat leg, the seat mount and seat leg attaching means comprising a pair of hollows defined within the bottom surface of the seat mount top portion, each hollow being functionally adapted to receive a seat leg stub therewithin.

20. The modular seat system of claim 19 wherein the seat mount middle portion extends generally forwardly of and downwardly from the top portion of the seat mount and includes a downwardly extending support portion for stabilizing the seat mount at the point of the uppermost edge of the primary base wall.

21. The modular seat system of claim 19 wherein the seat mount front portion includes a top surface and a bottom surface and includes means for removably attaching the seat mount to the primary wall of the base.

22. The modular seat system of claim 21 wherein the seat mount and base attaching means includes a seat mount retaining bracket attached to the bottom surface of the front seat mount portion and extending generally downwardly from it.

23. The modular seat system of claim 22 wherein the seat mount retaining bracket includes an inwardly extending flange, the bracket flange being engagable with a portion of the longitudinally extending support member.

24. The modular seat system of claim 17 including hinge means for attaching the seat mount unite to the primary wall of the base unit.

25. The modular seat system of claim 23 where the top surface of the front seat mount portion includes at least one cup-holding aperture and at least one rod holding aperture.

26. The modular seat system of claim 17 wherein the seat mounts are made of a single piece of molded material.

27. The modular seat system of claim 17 wherein the seat legs are made of a single piece of molded material.

28. The modular seat system of claim 17 wherein the seat mounts and the seat legs are integrally formed.

* * * * *

(12) EX PARTE REEXAMINATION CERTIFICATE (9221st)
United States Patent
Kleckner

(10) Number: US 7,150,442 C1
(45) Certificate Issued: Aug. 21, 2012

(54) ICE SHELTER MODULAR SEATING SYSTEM

(75) Inventor: Ryan J. Kleckner, Grafton, WI (US)

(73) Assignee: Frabill, Inc., Jackson, WI (US)

Reexamination Request:
No. 90/012,226, May 1, 2012

Reexamination Certificate for:
Patent No.: 7,150,442
Issued: Dec. 19, 2006
Appl. No.: 10/811,438
Filed: Mar. 26, 2004

Related U.S. Application Data

(60) Provisional application No. 60/474,904, filed on Jun. 3, 2003.

(51) Int. Cl.
*F16M 13/00* (2006.01)
*A47C 7/62* (2006.01)
*B63B 17/00* (2006.01)

(52) U.S. Cl. .................. 248/429; 114/363; 135/116; 135/137; 248/503.1; 297/217.7; 297/256.1

(58) Field of Classification Search .................. None
See application file for complete search history.

(56) References Cited

To view the complete listing of prior art documents cited during the proceeding for Reexamination Control Number 90/012,226, please refer to the USPTO's public Patent Application Information Retrieval (PAIR) system under the Display References tab.

*Primary Examiner* — Peter C. English

(57) ABSTRACT

An ice shelter modular seating system includes a base unit, one or more seat mount units and one or more seat leg units. The base unit is a generally rectangular tub-like member having a front wall and a floor. The floor includes a longitudinally extending and integrally formed track. This track is functionally adapted to receive the lowermost portion of the seat leg units in it, the track being used to restrain the seat leg units from front to back movement relative to the base unit front wall. A seat mount unit is removably attachable to the base unit front wall and is configured to rest upon the seat leg unit. In this fashion, seat mount units can be positioned along the base unit as desired or required in an almost infinite number of positions and combination of positions, with placement of the seat mount units being be made quickly and easily.

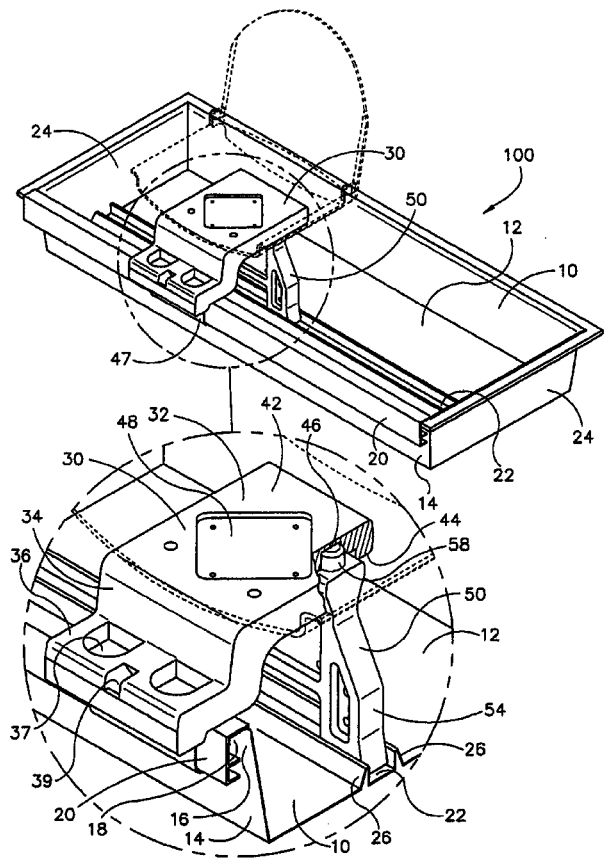

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-28 is confirmed.

* * * * *